US006848060B2

(12) United States Patent
Cook et al.

(10) Patent No.: US 6,848,060 B2
(45) Date of Patent: Jan. 25, 2005

(54) SYNCHRONOUS TO ASYNCHRONOUS TO SYNCHRONOUS INTERFACE

(75) Inventors: Peter W. Cook, Mount Kisco, NY (US); Stanley E. Schuster, Granite Springs, NY (US)

(73) Assignee: International Business Machines Corporation, Armonk, NY (US)

(*) Notice: Subject to any disclaimer, the term of this patent is extended or adjusted under 35 U.S.C. 154(b) by 698 days.

(21) Appl. No.: 09/794,467

(22) Filed: Feb. 27, 2001

(65) Prior Publication Data

US 2002/0120883 A1 Aug. 29, 2002

(51) Int. Cl.[7] ............................. G06F 13/42; G06F 3/00
(52) U.S. Cl. ..................... 713/400; 713/500; 713/502; 713/600; 713/601; 710/52; 710/58; 710/61
(58) Field of Search ................................. 713/400, 401, 713/500, 502, 503, 600, 601, 300, 323, 324; 326/93, 98, 95; 710/52, 58, 61

(56) References Cited

U.S. PATENT DOCUMENTS

| | | | |
|---|---|---|---|
| 4,837,740 A | | 6/1989 | Sutherland |
| 5,187,800 A | | 2/1993 | Sutherland |
| 5,939,898 A | * | 8/1999 | Henkels et al. ............... 326/93 |
| 6,182,233 B1 | | 1/2001 | Schuster et al. |
| 6,247,134 B1 | * | 6/2001 | Sproch et al. ............. 713/320 |
| 6,308,229 B1 | * | 10/2001 | Masteller ..................... 710/52 |
| 6,393,579 B1 | * | 5/2002 | Piazza ......................... 713/600 |
| 6,611,920 B1 | * | 8/2003 | Fletcher et al. ............. 713/322 |

FOREIGN PATENT DOCUMENTS

JP         05233380 A  *  9/1993  ........... G06F/11/34

OTHER PUBLICATIONS

Sjogren, A.E.; Myers, C.J.; "Interfacing synchronous and asynchronous modules within a high–speed pipeline", Very Large Sca Integration (VLSI) Systems, IEEE Transactions on, vol.: 8, Issue: 5, Oct. 2000, pp. 573–583.*
Schuster et al., "Asynchronous Interlocked Pipelined CMOS Circuits Operating at 3.3–4.5GHz", ISSCC 2000, Session 17, Logic and Systems, Paper WA 17.3.
U.S. patent appln. Ser. No. 09/746,647 filed Dec. 21, 2000 to Peter W. Cook, Andy Davies, Stanley E. Schuster and Daniel Stasiak entitled "Asynchronous Pipeline Control Interface".

* cited by examiner

Primary Examiner—Lynne H. Browne
Assistant Examiner—James K. Trujillo
(74) Attorney, Agent, or Firm—Louis J. Percello; F. Chau & Associates, LLC

(57) ABSTRACT

An interface between synchronous and asynchronous data transfer includes a plurality of stages coupled to each other to form a pipeline for data transfer. The plurality of stages include a first stage which performs synchronous to asynchronous data transfer, at least one intermediate stage which performs asynchronous to asynchronous data transfer and a last stage which performs asynchronous to synchronous data transfer. A synchronous clock path propagates a timing signal across the plurality of stages to enable the first and last stages to perform operations when the timing signal is present at that stage.

26 Claims, 18 Drawing Sheets

FIG. 5 Waveforms at 2.5 GHz and 2 cycle e bit delay

Waveforms at 2.0 GHz and 2 cycle e bit delay

SYNCHRONOUS TO ASYNCHRONOUS TO SYNCHRONOUS INTERFACE

BACKGROUND OF THE INVENTION

1. Field of the Invention

The present invention relates to data transfer, and more particularly to a system and method for transferring data via a synchronous to asynchronous to synchronous interface which behaves in a reliable manner and is adaptable for multiple frequencies of operation.

2. Description of the Related Art

Interlocked Pipelined complementary metal oxide semiconductor (IPCMOS) circuits and techniques are disclosed in U.S. Pat. No. 6,182,233, incorporated herein by reference. A paper describing the results of an implementation of these IPCMOS circuits on a test site is found in an article published in the ISSCC 2000 Digest of Technical Papers, Session 17, Logic and Systems, Paper WA 17.3, by Schuster et al. entitled "Asynchronous Interlocked Pipelined CMOS Circuits at 3.3–4.5 GHz", incorporated herein by reference and hereinafter referred to as the ISSCC paper. In the ISSCC paper, asynchronous interlocked locally generated clocks drive a path through a 3 to 2 compressor tree of a Floating Point Multiplier (FPM) at frequencies as fast as 4.5 GHz in a 0.18 micron 1.5 Volt bulk CMOS technology. Power reductions greater than two times are estimated with these IPCMOS techniques.

In U.S. patent application Ser. No. 6,182,233 referenced above, circuits and techniques are disclosed for asynchronously interlocking blocks in the forward and reverse directions that have extremely small overhead for handshaking. This makes very high performance possible.

Synchronous pipelines are typically subject to clock slew problems which may cause undesirable delays in the pipelines. It would be advantageous to replace portions of existing synchronous designs with asynchronous clocks and circuits to achieve higher performance and lower power. However, interfaces between a synchronous portion of the system and an asynchronous portion may be difficult to implement.

Therefore, a need exists for interfaces that make it possible to go from a synchronous mode of operation to an asynchronous mode of operation and then back to a synchronous mode in a reliable manner and at different frequencies. A further need exists for implementing circuits and timing concepts needed to provide these synchronous to asynchronous to synchronous interfaces.

SUMMARY OF THE INVENTION

An interface between synchronous and asynchronous data transfer includes a plurality of stages coupled to each other to form a pipeline for data transfer. The plurality of stages include a first stage which performs synchronous to asynchronous data transfer, at least one intermediate stage which performs asynchronous to asynchronous data transfer and a last stage which performs asynchronous to synchronous data transfer. A synchronous clock path propagates a timing signal across the plurality of stages to enable the first and last stages to perform operations when the timing signal is present at that stage.

A method for synchronous to asynchronous to synchronous data transfer includes providing a plurality of stages coupled to each other to form a pipeline. The plurality of stages include a first stage which performs synchronous to asynchronous data transfer, at least one intermediate stage which performs asynchronous to asynchronous data transfer and a last stage which performs asynchronous to synchronous data transfer. One of the first stage and the last stage of the plurality of stages are enabled only when an operation is to be performed to permit data transfer. The first and last stages are enabled by local clock signals generated by a clock circuit included at each of the plurality of stages. The local clock signal is generated by a synchronous clock signal and a timing signal.

A synchronous clock gating interface includes a plurality of synchronous stages coupled to each other to form a pipeline. A clock circuit is coupled to each of the plurality of stages which generates a local clock signal for a corresponding stage based on a synchronous clock signal and a timing signal wherein the local clock signal enables the corresponding stage when an operation is to be performed by the corresponding stage.

These and other objects, features and advantages of the present invention will become apparent from the following detailed description of illustrative embodiments thereof, which is to be read in connection with the accompanying drawings.

BRIEF DESCRIPTION OF DRAWINGS

The invention will be described in detail in the following description of preferred embodiments with reference to the following figures wherein.

DETAILED DESCRIPTION OF PREFERRED EMBODIMENTS

Figure 1:
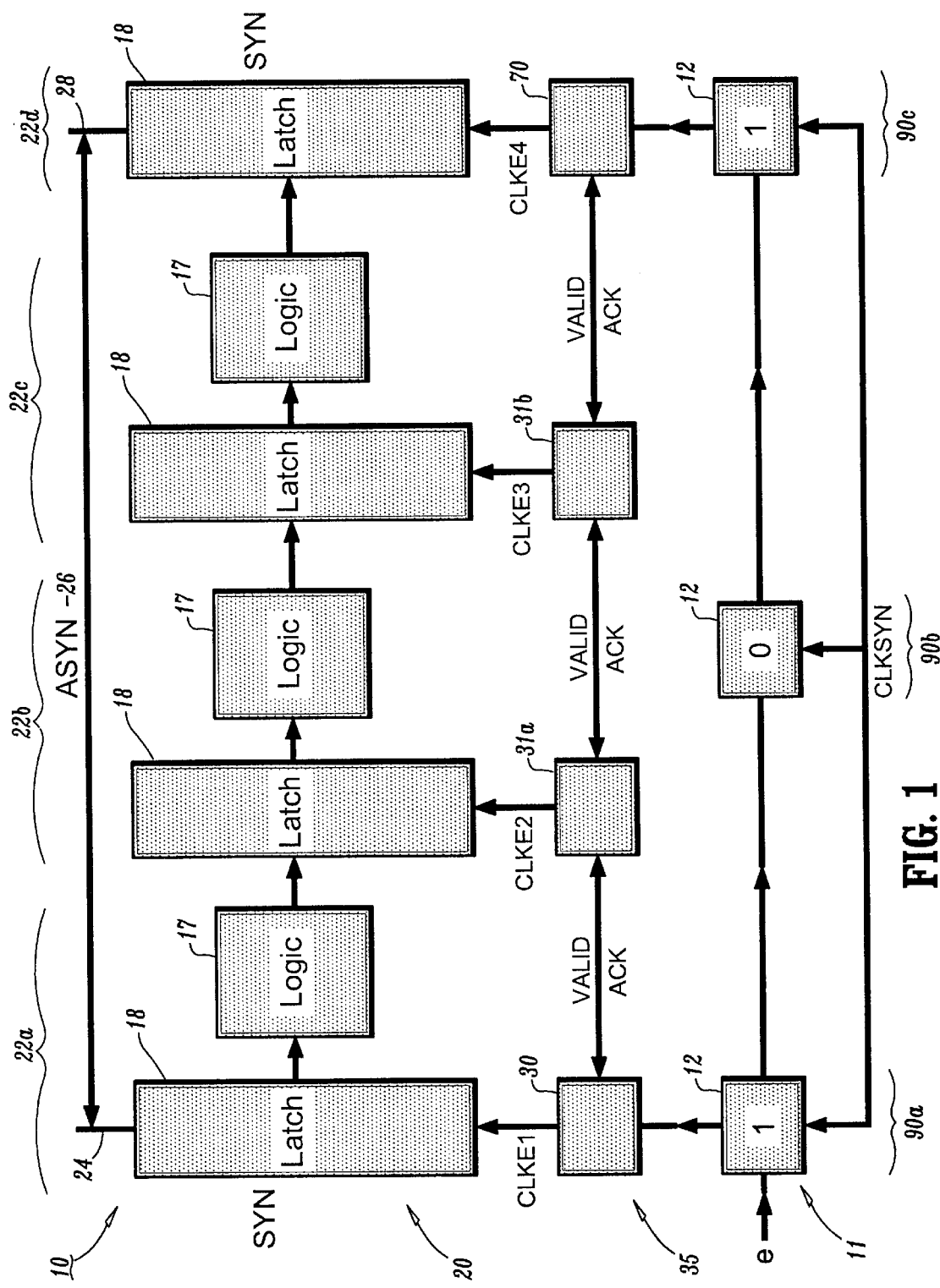
FIG. 1 is a schematic diagram showing a synchronous to asynchronous to synchronous interface in accordance with one embodiment of the present invention.

The present invention provides a synchronous to asynchronous to synchronous interface which can be employed to improve speed and reduce power of pipelines or data transfer systems. The present invention will be described in terms of illustrative circuits. The present invention is broader and should not be construed as limited by these examples.

It should be understood that the elements shown in the FIGS. may be implemented in various forms of hardware, software or combinations thereof. Preferably, these elements are implemented in hardware on one or more appropriately programmed general purpose integrated circuits which may include a processor, memory and input/output interfaces. Referring now to the drawings in which like numerals represent the same or similar elements and initially to FIG. 1, a synchronous (SYN) to asynchronous (ASYN) to synchronous (SYN) interface 10 is shown in accordance with one embodiment of the present invention. A synchronous timing path 11 includes one bit wide latches 12 clocked by a CLKSYN signal that have as an input what will be referred to as an e bit. Since each of these latch stages 12 is clocked by CLKSYN, the time it will take for an e bit to propagate through latches 12 is a function of the number of latch stages 12 in a path or pipe 11 and the frequency or period of CLKSYN.

The "e" bit path 11 (e.g., stages 90a, 90b, 90c in FIG. 1) is a synchronous timing chain. A "1" is introduced into the first stage (90a) of this chain if data is presented to the asynchronous path for processing by the synchronous part of the machine. On any synchronous cycle for which no such data is introduced, the e bit entering 90a will be 0. In FIG. 1, an e bit introduced into stage 90a on a given synchronous cycle will propagate to stage 90b one synchronous cycle later, and will arrive at stage 90c exactly two synchronous cycles after its introduction at stage 90a. Thus, the e bit propagates through its timing chain with a delay of two synchronous cycles. Because a "1" in stage 90c will signify data is ready to be placed into the synchronous part of the machines it is necessary to provide in the e bit timing chain enough stages to allow for data propagation through the entire asynchronous pipeline. In FIG. 1, then, it is implied that data can propagate through the asynchronous pipeline in two synchronous cycles.

The overall operation of the interface operates as follows. When data is presented by the synchronous part of the machine to the asynchronous part, a "1" is placed into stage 90a. This serves as a signal to initiate the local clock CLKE1 of 22a. Thereafter, data propagates through 22a, 22b and 22c to 22d in a manner controlled by the asynchronous clocks CLKE1, CLKE2 and CLKE3, which are in turn controlled by the VALID and ACK signals linking the clock blocks 30, 31a and 31b of these stages (E.g., interlocking signals). At the same time, the "1" introduced at stage 90a has propagated to stage 90b, and appears at the input to stage 90c. On the next synchronous clock (now two synchronous cycles after the data was introduced into the asynchronous part of the machine) the e bit serves to gate the synchronous clock into CLKE4, thus completing the re-synchronization of the system.

Note that this implies certain relationships be satisfied. First, the number of stages of delay provided for the e bit path should be such that at the highest operating synchronous clock frequency, the total delay in the e bit path is no less than the delay through the asynchronous path. This is a timing need similar to the normal timing requirement of a synchronous stage (i.e., the requirement that the clock period be no less than the delay through the logic of the stage plus an allowance for latch set up, hold, and clock skew). If the asynchronous pipeline is being used to replace a previously synchronous pipeline, it will generally be adequate to provide for the e bit delay a delay corresponding to the number of stages in the original synchronous pipeline. In this case, as many latch stages in the asynchronous pipeline should be provided as were in the original synchronous pipeline to provide places to retain all pipeline data in the event there are delays in removing data from the asynchronous pipeline.

Note finally that because the e bit introduced into stage 90a is used to initiate the asynchronous clock CLKE1 in stage 22a, and that clock in turn initiates CLKE2 and CLKE3, and the same e bit arriving at the input to stage 90c enables CLKE4, when no new data is presented to the asynchronous pipeline for processing, the clocks of that pipeline shut down automatically and smoothly.

In addition, there is a parallel path 20 for data including stages 22a–22d with three different interface types. First, there is a synchronous to asynchronous interface 24 which is implemented in the first stage 22a when CLKSYN and the e bit are ANDed together to generate a local clock CLKE1. Next, there are intermediate stages 22b–22c where the asynchronous to asynchronous transfers take place. These asynchronous to asynchronous interfaces are described in detail in U.S. Pat. No. 6,182,233, the ISSCC paper and a commonly assigned application to Cook et al., U.S. Ser. No. 09/746,647, entitled "ASYNCHRONOUS PIPELINE CONTROL INTERFACE" filed Dec. 21, 2000, all incorporated herein by reference. An asynchronous to synchronous interface 28 is implemented in a last stage 22d. In stage 22d, the e bit has propagated through the synchronous one bit latches 12 and is ANDed with the synchronous clock CLKSYN to generate the local clock CLKE4. CLKE2 and CLKE3 are provided for stages 22b and 22c. Differences in the circuits between the first stage 22a and last stage 22d will be covered when the circuits for each interface type are described in detail herein below. A valid path 35 is included to track data transfer of the data path 20 and to acknowledge the receipt of valid data between the stages in data path 20.

Each of latches 18 are enabled by the local clock enable signal CLKE (CLKE1–CLKE4) to permit data transfer from the previous stage. The stages are interlocked. This means that acknowledge (ACK) and valid (VALID) data signals are generated and passed between adjacent stages to ensure that data is both valid and received between each stage of the pipeline. Advantageously, the asynchronous intermediate stages of circuit 10 are pipelined and interlocked in the forward and reverse directions as described in the ISSCC paper. Pipeline stages 22 may include logic circuits 17.

Figure 2A:
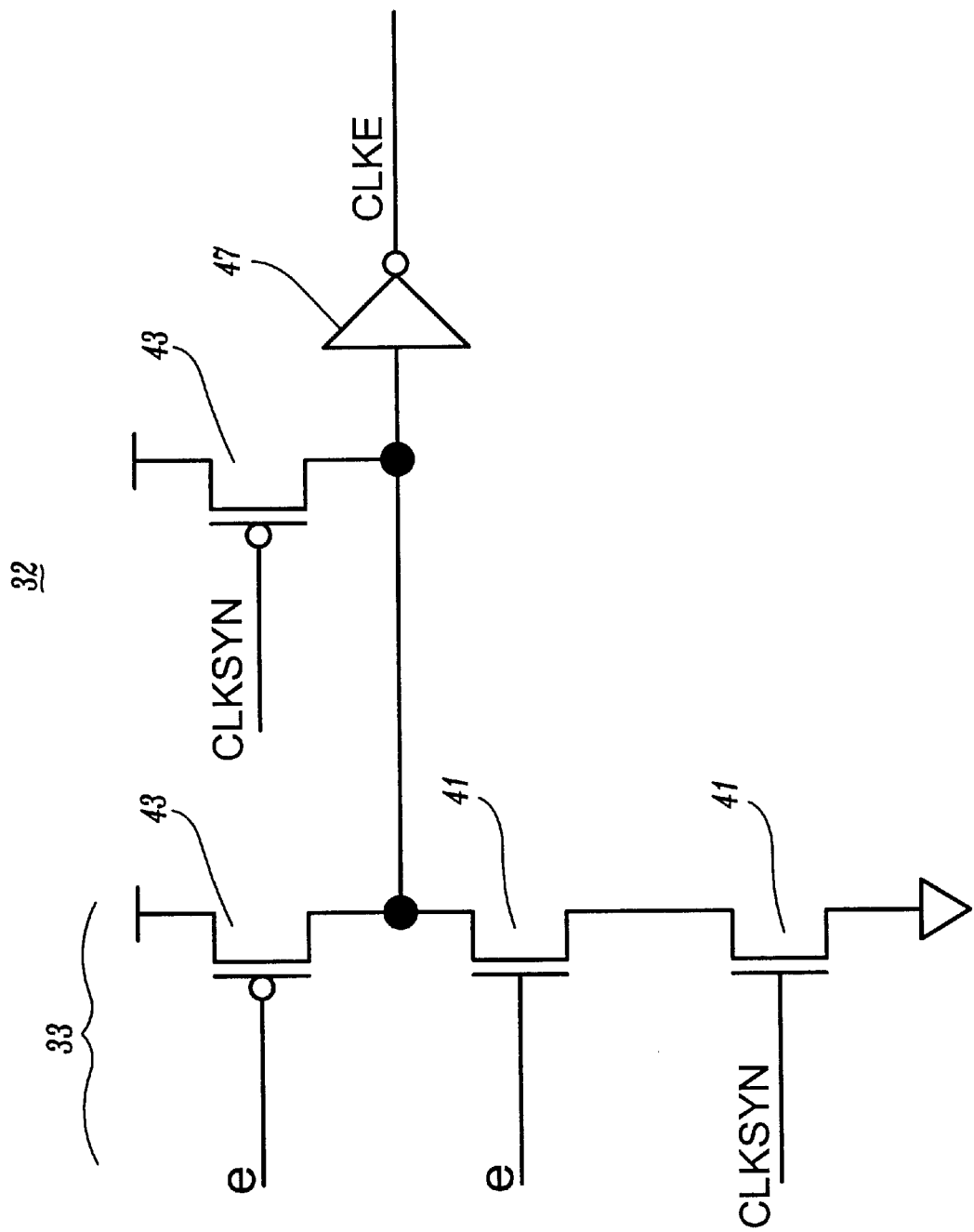
FIG. 2A is a schematic diagram showing a clock enable circuit for generating a local clock for a synchronous to asynchronous stage of the interface of FIG. 1 in accordance with the present invention.
Figure 2B:
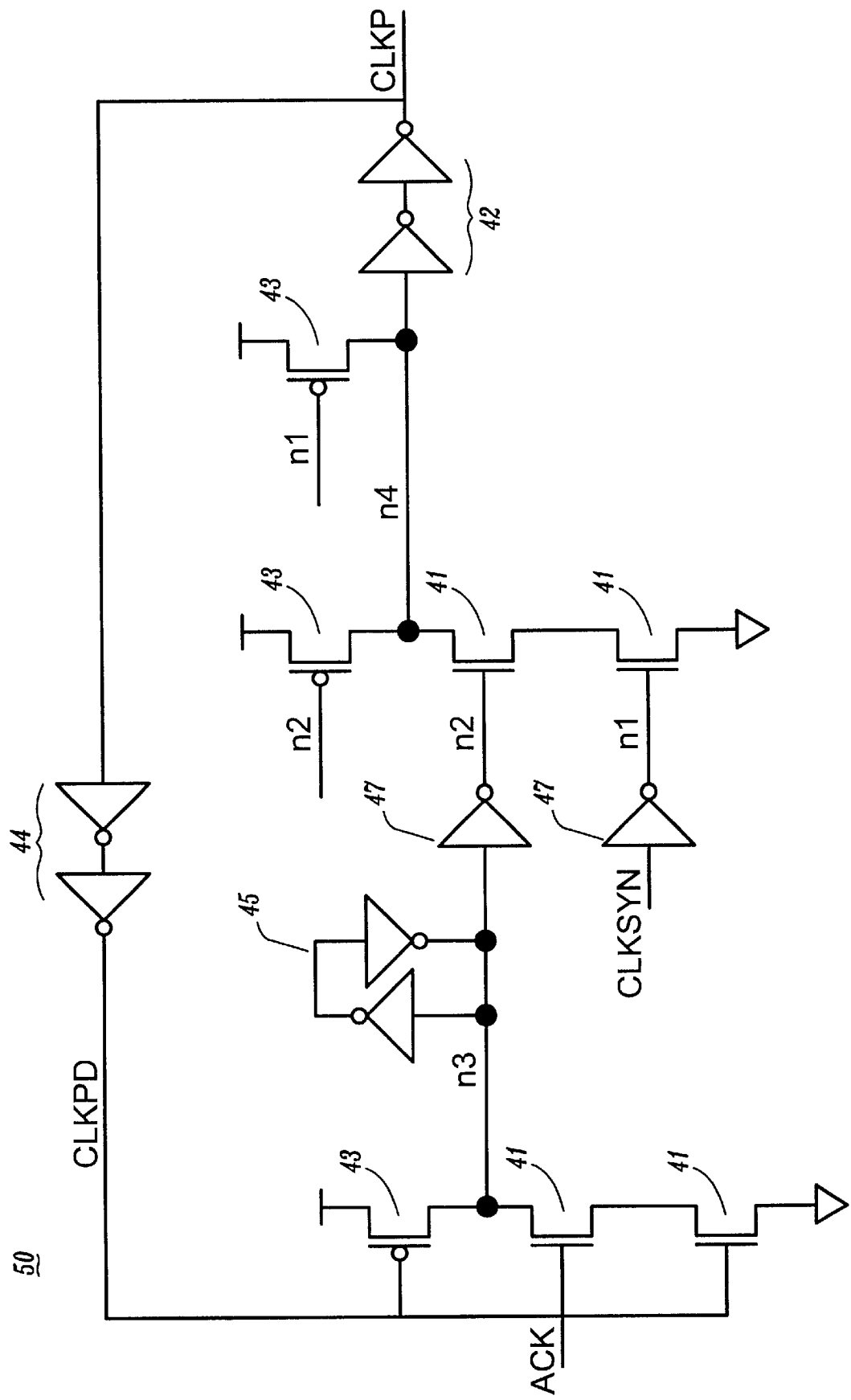
FIG. 2B is a schematic diagram showing a precharge clock circuit for generating a precharge clock pulse in accordance with an acknowledge signal for a synchronous to asynchronous stage of the interface of FIG. 1 in accordance with the present invention.

Referring to FIG. 1 and FIGS. 2A–B, the synchronous to asynchronous first stage local clock circuit 30 which performs an AND function (AND gate 33) in circuit 32 on the e bit and CLKSYN, generates the VALID signal for the down stream asynchronous stage and generates the pre-charge clock CLKP for this first stage as shown in FIG. 2B. The AND of the global synchronous clock CLKSYN and the e bit input to the one bit wide latch stage 12 enable the local clock CLKE (CLKE1) for the first stage as shown in the circuit of FIG. 2A. Even though CLKSYN is running continuously a significant power reduction results from enabling CLKE1 only when there is an operation to be performed as indicated by the e bit.

Referring to FIG. 2A, circuit 30 of FIG. 1 includes an AND gate 32 for logically combining the e bit and CLKSYN to provide an enable clock signal CLKE. Circuit 32, in the embodiment shown, employs NFETS 41, PFETS 43 and inverter 47. Referring to FIG. 2B, a circuit 50, included in circuit 30 of FIG. 1, generates the local pre charge clock CLKP1 of first stage 22a. The precharge clock circuit 50 has as its inputs an asynchronous acknowledgment signal ACK (see also FIG. 1) from the down stream stage indicating data has been received and new data can be sent plus the global synchronous clock CLKSYN. The local precharge clock CLKP is enabled only after CLKSYN (and CLKE1) goes low to avoid the possibility of having both the enable and pre-charge clocks on at the same time. This may be a possibility, especially at lower frequencies, if only the asynchronously generated acknowledge signal ACK was used to generate the local pre-charge clock CLKP.

Circuit 50, in the embodiment shown, employs NFETS 41, PFETS 43, latch 45 and inverters 47. Other circuit configurations may be employed to provide the functionality as described below. At the beginning of a cycle, CLKPD is high and node n3 is high and node n2 is low. When there is an acknowledgment, a high going pulse will occur on the ACK input. This transition of ACK will be captured on nodes n3 and n2 with n3 going low and n2 going high. If CLKSYN has already gone low, node n1 will be high causing n4 to go low. If CLKSYN is still high, node n1 will be low, and node n4 will remain high until CLKSYN transitions low. Node n4 discharging will be followed by CLKP discharging after delay of two inverters 42 and CLKPD discharging after delay of two inverters 44. A low state on CLKPD will precharge node n3 high. This will then cause node n4 to go high followed by CLKP going high and finally CLKPD going high. The asynchronous acknowledge ACK pulse by this time has had ample time to transition low and another cycle is ready to begin.

Figure 2C:
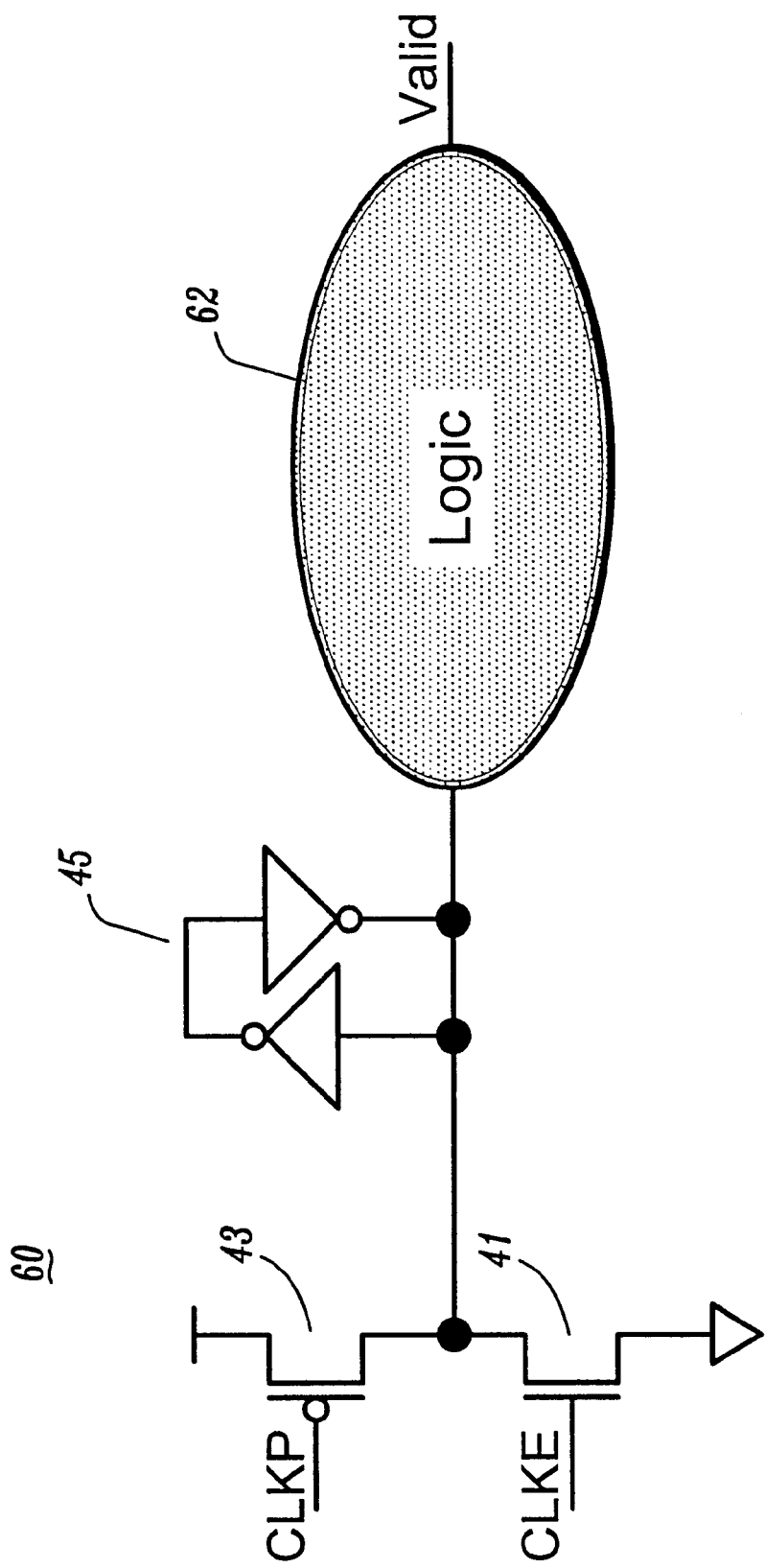
FIG. 2C is a schematic diagram showing a valid circuit for generating a valid signal for a synchronous to asynchronous stage of the interface of FIG. 1 in accordance with the present invention.

Referring to FIG. 2C, circuit 30 of FIG. 1 includes a valid circuit 60 which generates the VALID signal that emulates a worst case path through logic 17 of first stage 22a. Logic 62 simulates the delay characteristics of logic 17 of stage 22a. Logic 62 generates the timing for a valid signal based on these delay simulations. Delay through the valid circuit 60 plus the time it takes to generate CLKE in the strobe circuit (AND gate) 32 of the adjacent asynchronous hand-shaking block 31a equal the last data arrival time plus some margin to account for tolerance variations between the data path 20 and the valid path 35. As shown in FIG. 2C, CLKE initiates the Valid signal and CLKP resets this signal. The VALID signal is generated on every clock cycle for which CLKE is generated.

Asynchronous to asynchronous transfer for intermediate stages 22b–22c in FIG. 1 may be performed by the inter-locking methods of the above cited references. Other asynchronous to asynchronous transfer techniques may also be employed. The circuits and concepts needed for asynchronous to synchronous transfer as shown in FIG. 1 will now be described.

Figure 3A:
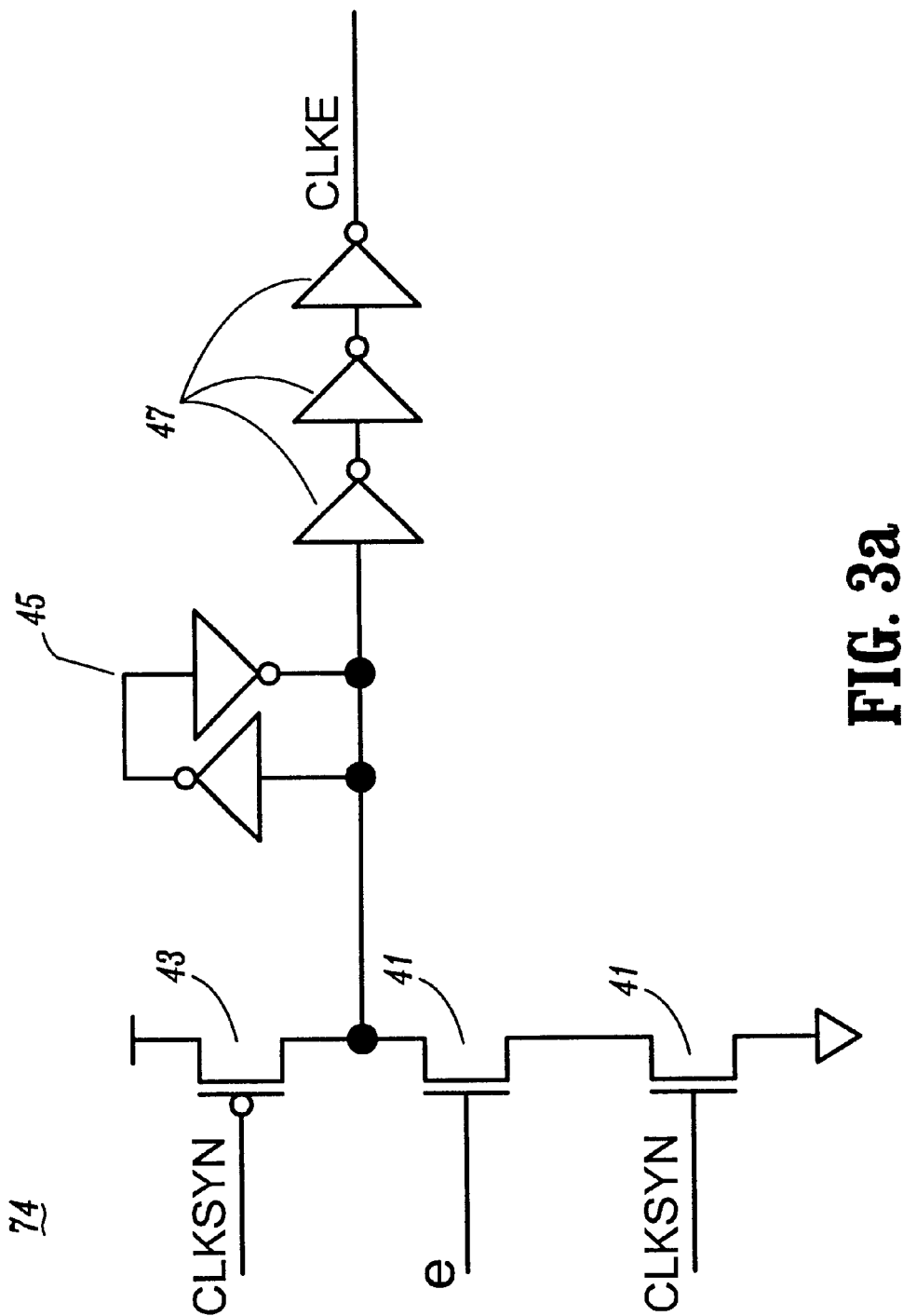
FIG. 3A is a schematic diagram showing a clock enable circuit for generating a local clock for an asynchronous to synchronous stage of the interface of FIG. 1 in accordance with the present invention.
Figure 3B:
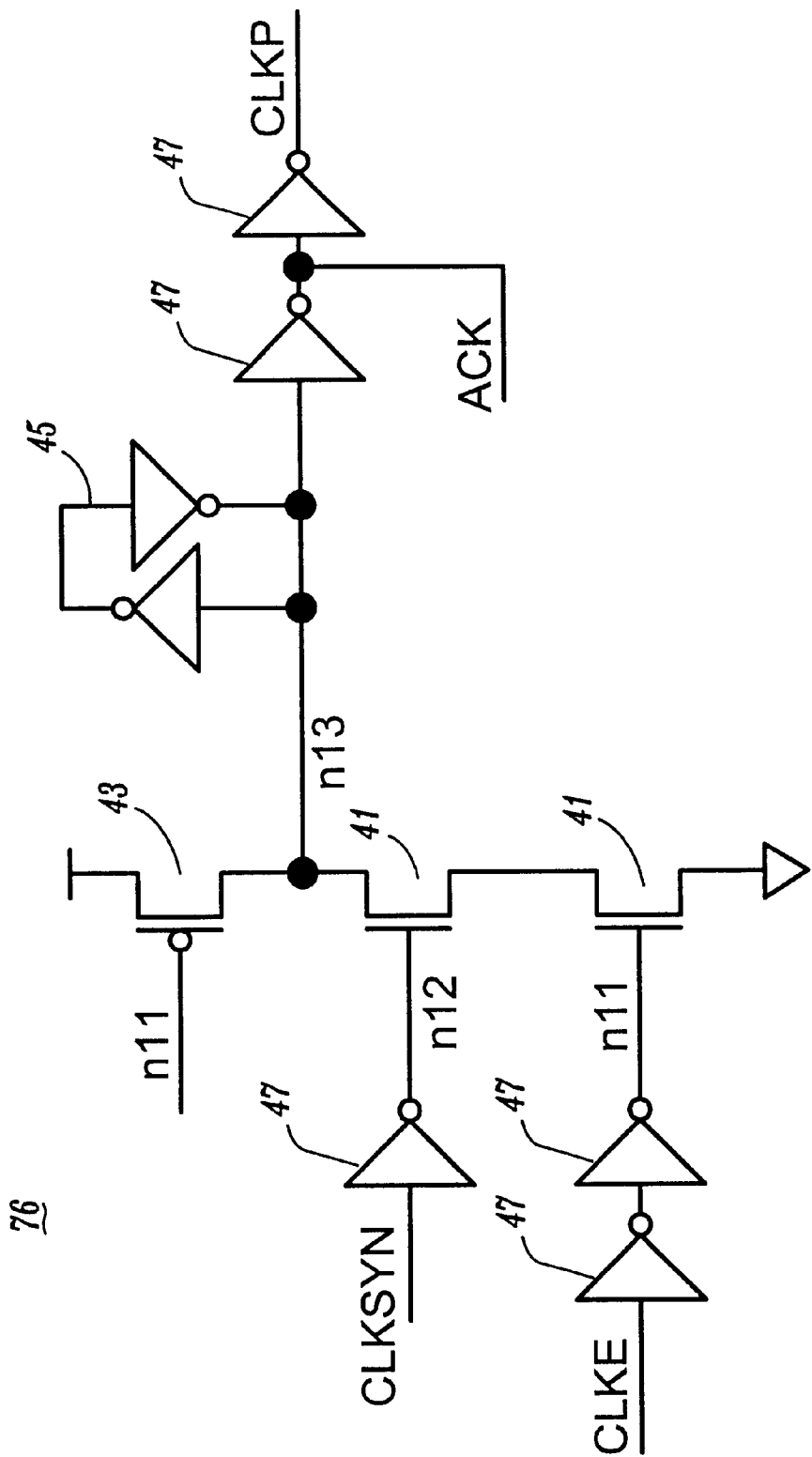
FIG. 3B is a schematic diagram showing a precharge clock circuit for generating a precharge clock pulse in accordance with an acknowledge signal for an asynchronous to synchronous stage of the interface of FIG. 1 in accordance with the present invention.
Figure 3C:
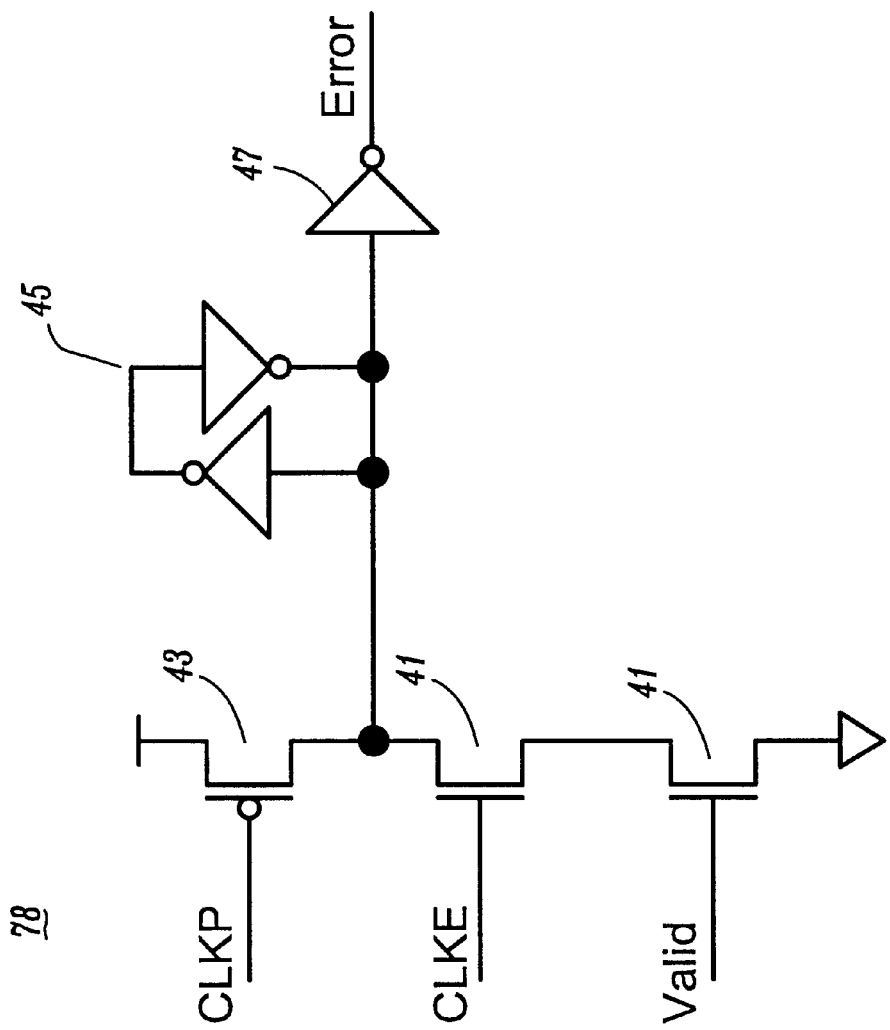
FIG. 3C is a schematic diagram showing an error circuit for generating an error signal for an asynchronous to synchronous stage of the interface of FIG. 1 in accordance with the present invention.

Referring again to FIG. 1, an asynchronous to synchronous last stage local clock circuit 70 is shown in greater detail (FIGS. 3A–C). Circuits of local clock circuit 70 include an enable clock circuit 74 (FIG. 3A), a precharge clock circuit 76 (FIG. 3B) and an error circuit 78 (FIG. 3C).

Referring to FIG. 3A, an enable clock CLKE is generated by circuit 74, when CLKSYN goes high and there is an e bit (high) in the one high synchronous register 12, corresponding to the last stage 22d in FIG. 1. Circuit 74 includes a latch 45 and a buffer 47 with three inverters to provide drive for CLKE which is output therefrom.

The asynchronous to synchronous enable clock circuit 74 of FIG. 3A is similar to the synchronous to asynchronous enable clock circuit 32 of FIG. 2A. Both circuits 32 and 74 AND the synchronous global clock CLKSYN with the e bit. However, in the enable clock circuit 74, the e bit has been delayed by a number of cycles. The number of cycles of the delay is the number of cycles it takes for the e bit to propagate through the one bit high synchronous registers 12. In FIG. 1, a delay of two cycles is shown. It should be understood that this is not a fixed delay but depends on the synchronous global clock frequency. The number of cycles is fixed for the embodiment shown but not the time. This means that once the pipe is designed the data will always appear at the output of the pipe a fixed number of cycles later even though the frequency changes. The cycle number may also be changed for the present invention.

Referring to FIG. 3B, precharge clock CLKP is generated by circuit 76 for this stage. Precharge circuit 76 for the asynchronous to synchronous stage generates both the acknowledge signal ACK that data has been received from the upstream stage and the precharge clock CLKP needed for the asynchronous to synchronous stage. Both ACK and CLKP are designed to occur after CLKSYN and CLKE transition low. The circuit is a one shot that is triggered by CLKSYN going low which causes node n12 to go high. CLKE will also go low but is delayed from CLKSYN by the path through the CLKE circuit 74 of FIG. 3A. Therefore, when CLKSYN transitions low, CLKE and node n11 will be high, and node n13 will go low. ACK will go high and CLKP will fall. When CLKE falls, node n11 will also fall, ACK will go low and CLKP will rise. The pulse width of ACK and CLKP are determined by the delay between node n12 rising and node n11 falling with most of this delay coming from the CLKE circuit 74.

Referring to FIG. 3C, error circuit 78 is activated when an enable e bit and CLKSYN, and therefore CLKE, go high, but data has not arrived. This should not happen unless there is an error in the timing. The inputs to the error circuit 78 are CLKE and the data valid signal VALID from the transmitting stage. For correct timing, when CLKE goes high enabling latches 18 of data path 20 (FIG. 1), the new data at the inputs to this asynchronous to synchronous stage should be valid. This is indicated by a low VALID signal. If VALID is still high and has not transitioned low, but CLKE has gone high an ERROR output signal will go high indicating an error has occurred.

Figure 4:
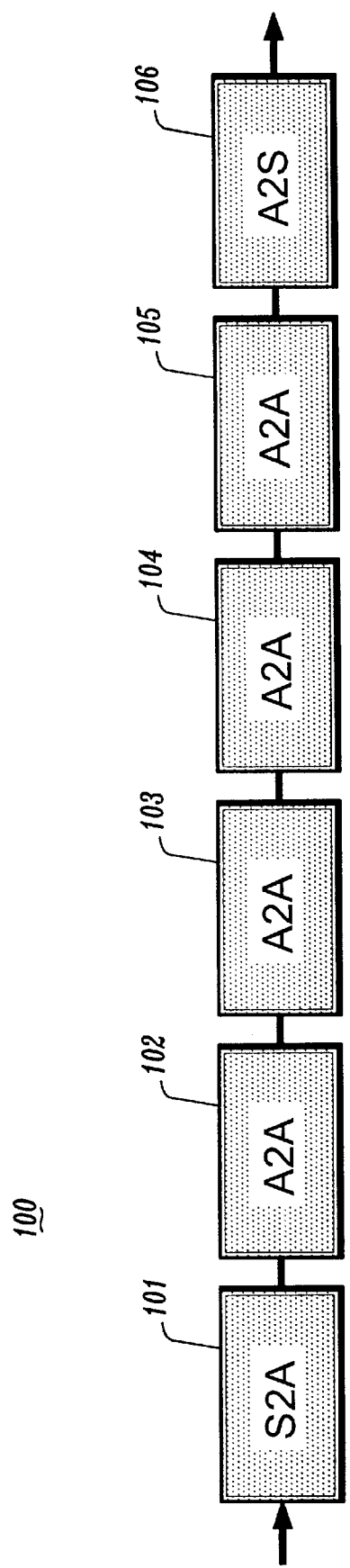
FIG. 4 is a schematic diagram of a six stage interface or pipeline employed in a simulation of the present invention.

To verify the circuits and concepts of the synchronous to asynchronous to synchronous interface of the present invention, a circuit 100 was built, as shown in FIG. 4 and simulated by the inventors. Circuit 100 includes six stages 101–106, which include the features described with reference to FIGS. 1, 2A–C and 3A–C. Stage 101 includes the synchronous to asynchronous interface (S2A). The circuits for this S2A stage include the circuits of FIGS. 2A–C. Stages 102 through 105 may include the asynchronous to asynchronous interfaces (A2A) described in the above cited references. Stage 106 is the asynchronous to synchronous interface (A2S). The circuits for A2S stage 106 are those of FIGS. 3A–C.

Figure 5:
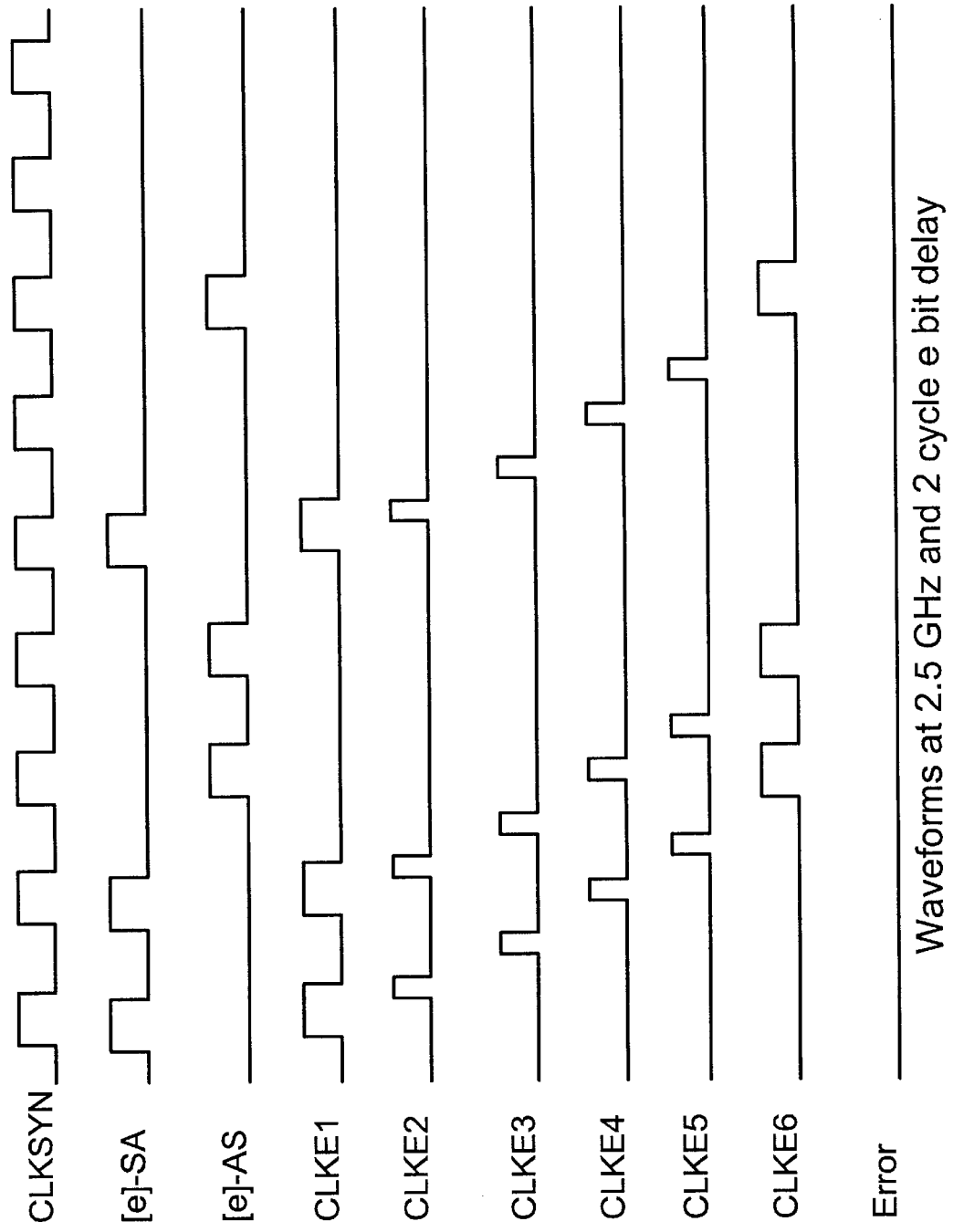
FIG. 5 is a timing diagram for the interface of FIG. 4 run at 2.5 GHz with a two cycle e bit delay in accordance with the present invention.

Referring to FIG. 5, synchronous clock CLKSYN and e bits [e]-SA (synchronous to asynchronous) for the latch (see e.g., latch 12 of FIG. 1) of stage 101 and [e]-AS (asynchronous to synchronous) for the latch (see e.g., latch 12 of FIG. 1) of stage 106) which generate enable and pre charge clocks and error signal (Error). The e bit propagates through the synchronous timing path at 2.5 GHz with a two cycle delay from the synchronous to asynchronous interface at stage 101 to the asynchronous to synchronous interface at stage 106. Note that "[e]-SA" is the e bit introduced into the synchronous to asynchronous interface, and "[e]-AS" is the delayed e bit appearing at the input to the last stage of the e bit delay path. Only the signal "[e]-SA" need be provided to the interface from the external environment to signify that data is actually present to be processed.

Correct operation for two consecutive e bits followed by a gap of two cycles and then another e bit is shown. This is a two cycle delay in the synchronous path ([e]-SA and [e]-AS). As shown, there are two successive synchronous cycles in which data to be processed is presented to the asynchronous pipeline, followed by two successive synchronous cycles in which no data is presented for processing, followed by another synchronous cycle where data is processed. Note that [e]-AS shows the same pattern as [e]-SA, but delayed by two synchronous cycles through the e bit delay chain.

Enable clock signals CLKE1–CLKE6 are shown for each stage 101–106, respectively. The measured latency for the six stage pipe is 880 ps which corresponds to two 400 ps cycles plus the delay in generating the enable clock. The identical conditions are repeated in the wave forms of FIG. 6 except at a frequency of 2.0 GHz. Again, correct operation is shown for the synchronous to asynchronous to synchronous interfaces with some additional margins because of the slower frequency of operation.

Figure 6:
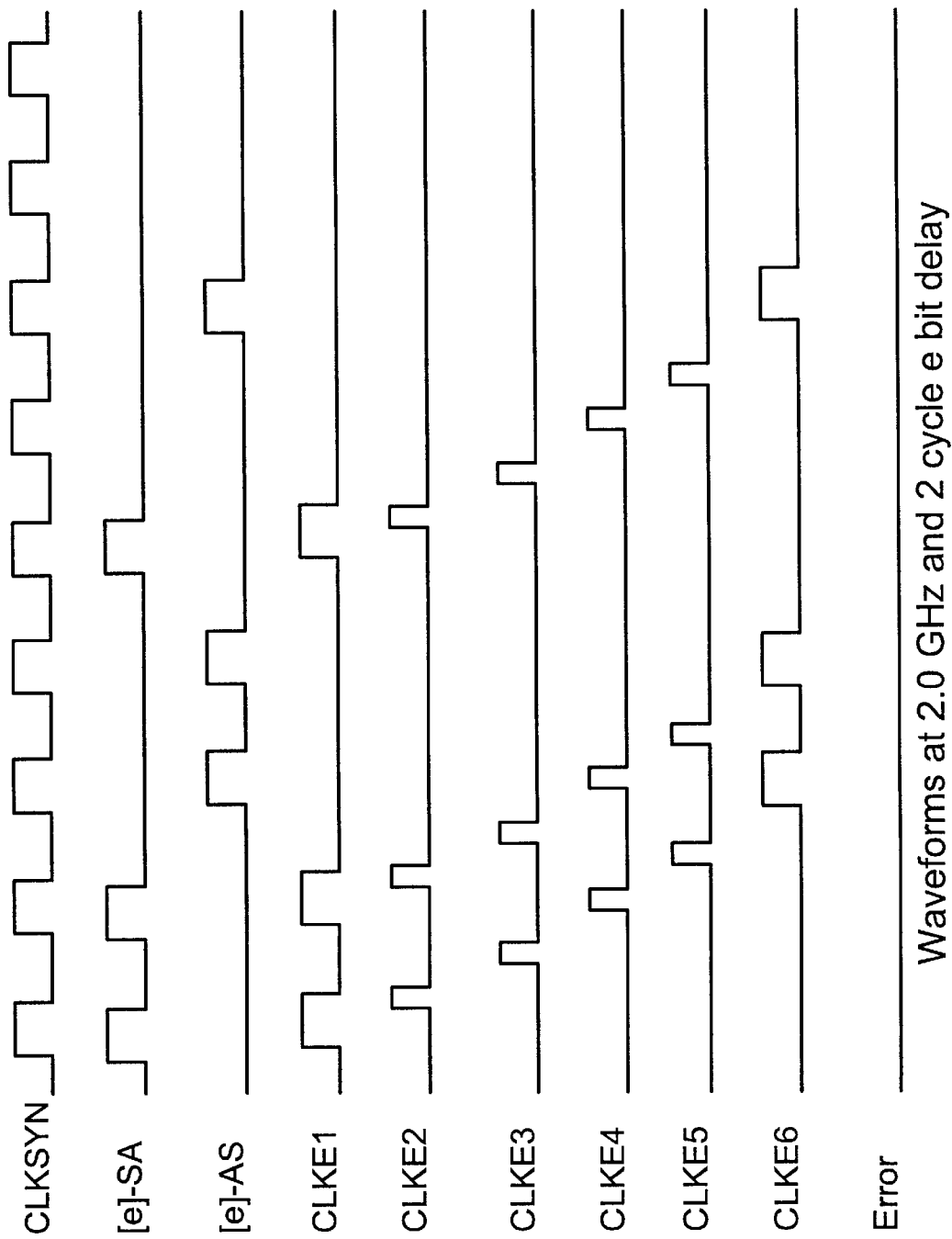
FIG. 6 is a timing diagram for the interface of FIG. 4 run at 2.0 GHz with a two cycle e bit delay in accordance with the present invention.
Figure 7:
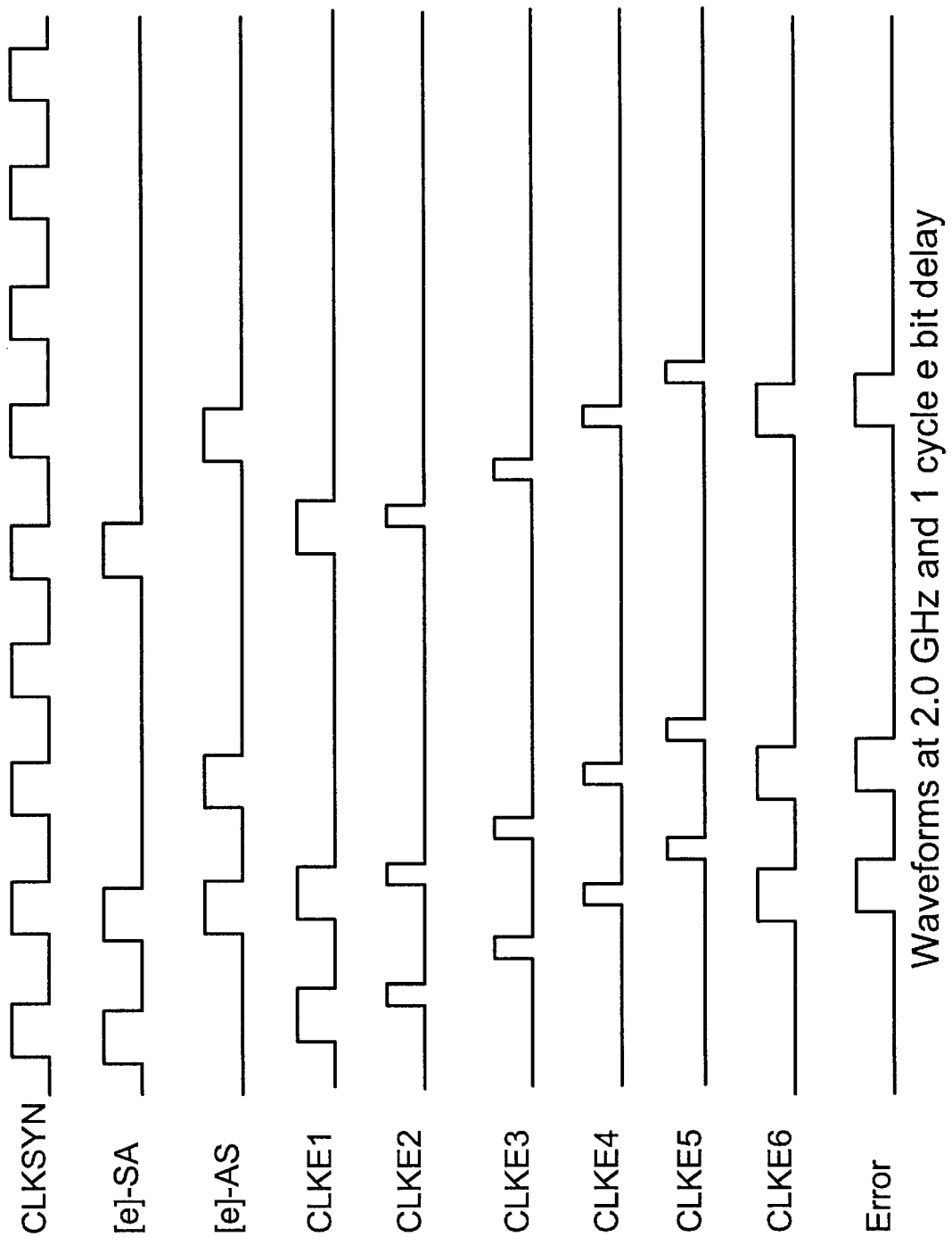
FIG. 7 is a timing diagram for the interface of FIG. 4 run at 2.0 GHz with a one cycle e bit delay and showing errors due to timing mismatches in accordance with the present invention.

Referring to FIG. 7, the e bit delay is now reduced to one cycle with the other conditions the same as those of FIG. 6. For this one cycle delay in the e bit, the latency of the pipe is greater than the single cycle e bit delay and the error circuit signal Error goes high indicating a timing error has occurred. Note that this represents an incorrect design to illustrate the detection of timing errors through the error circuitry and "Error" signal. The design error introduced in this test case is the deliberate provision of an e bit delay chain that is shorter than the delay through the asynchronous pipeline.

Estimates show that about 70% of chip power is consumed in clocks and latches. Therefore, significant power reduction results from enabling the clocks only when there is an e bit or an operation to perform, i.e., the switching factor, as seen in the wave forms of FIGS. 5, 6, and 7 of the synchronous to asynchronous to synchronous interfaces. A straight forward way of leveraging the low power the present invention offers is to replace existing pipelined stages in a synchronous system, for instance in a multiplier, with the synchronous to asynchronous interface of the present invention. This synchronous to asynchronous path will have significantly lower power than the conventional synchronous approach. First, because the clocks are enabled only when there is an operation to perform and secondly because of the reduced clock loading. The reduced clock loading results from the interlocked operation and the clocks being enabled only when data at the input to the latch is valid.

The fraction of (synchronous) cycles in which a given macro or functional unit is actually given data to process is called the "macro switching factor." or switching factor. Note that if that macro is implemented as an asynchronous pipeline using the techniques herein described, then the macro switching factor will be identical to the fraction of cycles of which the e bit into the synchronous to asynchronous interface of the macro is set to 1. This leads to a simple estimate of the power used in a system using the techniques described herein due to the fact that locally generated clocks are active only when actually needed.

Figure 8:
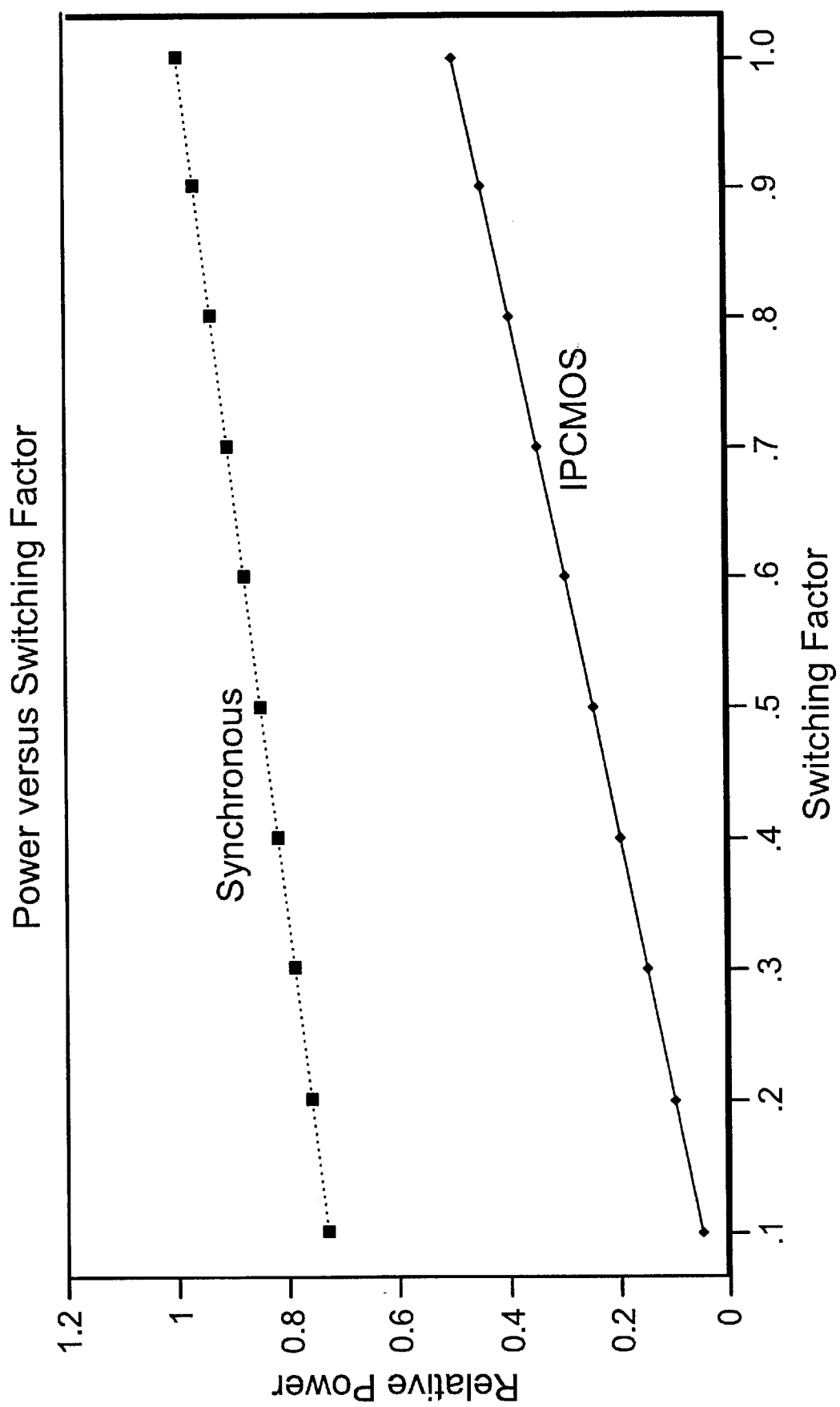
FIG. 8 is a plot of power versus switching factor comparing conventional synchronous circuits to interlocked pipeline CMOS circuits employing the present invention.

Referring to FIG. 8, a plots of power versus macro switching factor (assuming about 70% of the power is in the clocks and latches) for both a conventional synchronous approach (Synchronous) and IPCMOS employed in accordance with the present invention (IPCMOS) are shown. Most macros will have switching factors of between about 10% to about 20%.

Figure 9A:
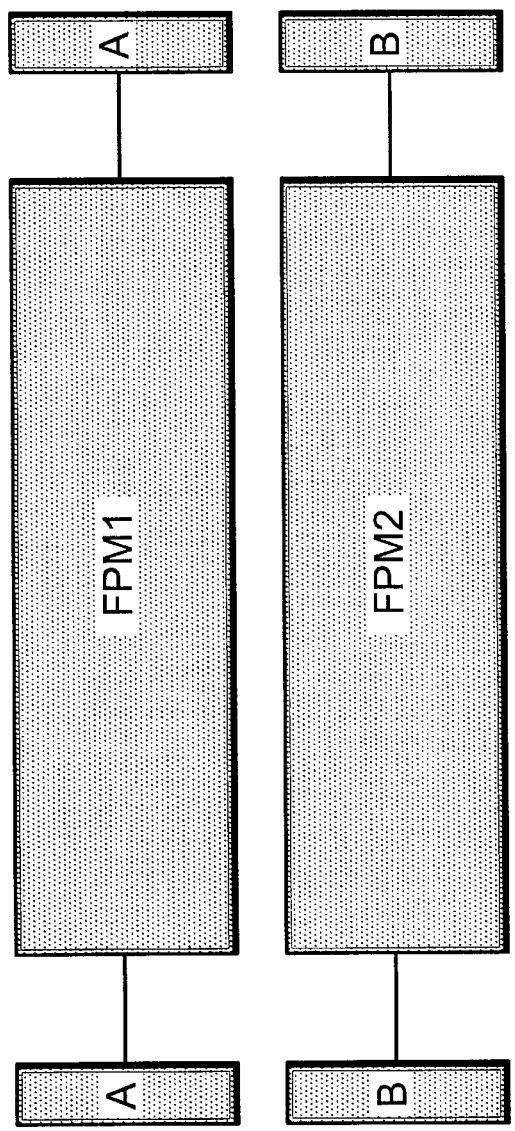
FIG. 9A shows two synchronous Floating Point Multipliers (FPMs)
Figure 9B:
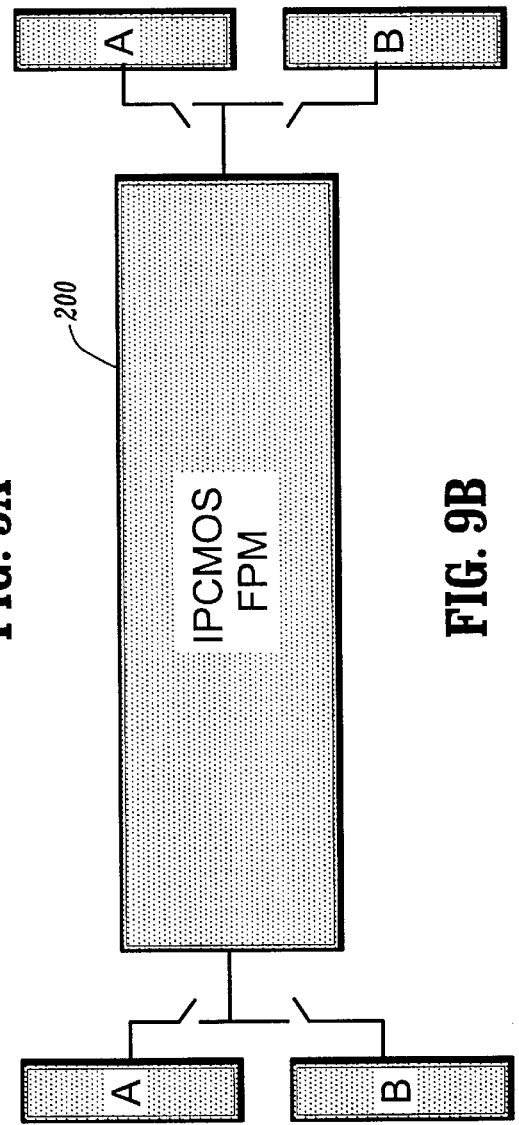
FIG. 9B shows a schematic diagram of a synchronous to asynchronous to synchronous IPCMOS FPM of the present invention which replaces two FPM's of FIG. 9A.

Another way of leveraging the high speed and low power that the present invention provides is shown in the example of FIGS. 9A and 9B. In FIG. 9A, two synchronous Floating Point Multipliers (FPMs) FPM1 and FPM2 have been replaced by a single synchronous to asynchronous to synchronous FPM unit 200 in FIG. 9B. The requirement is that this single asynchronous FPM 200 runs at twice the frequency of the existing synchronous multipliers FPM1 and FPM2.

The asynchronous approach achieves higher speed from the interlocked pipelined local clock generation and from the simple latch structure which results from enabling the clocks only when data is valid. The synchronous to asynchronous to synchronous interface that has been described is not restricted to this multiplier application but could be used wherever high speed and low power are needed. The present invention is particularly useful for highly pipelined stage applications.

The concepts and circuits needed to implement synchronous to asynchronous to synchronous interfaces, for example, by employing IPCMOS have been illustratively described. Higher speed and lower power is advantageously achieved in accordance with the present invention.

Figure 10:
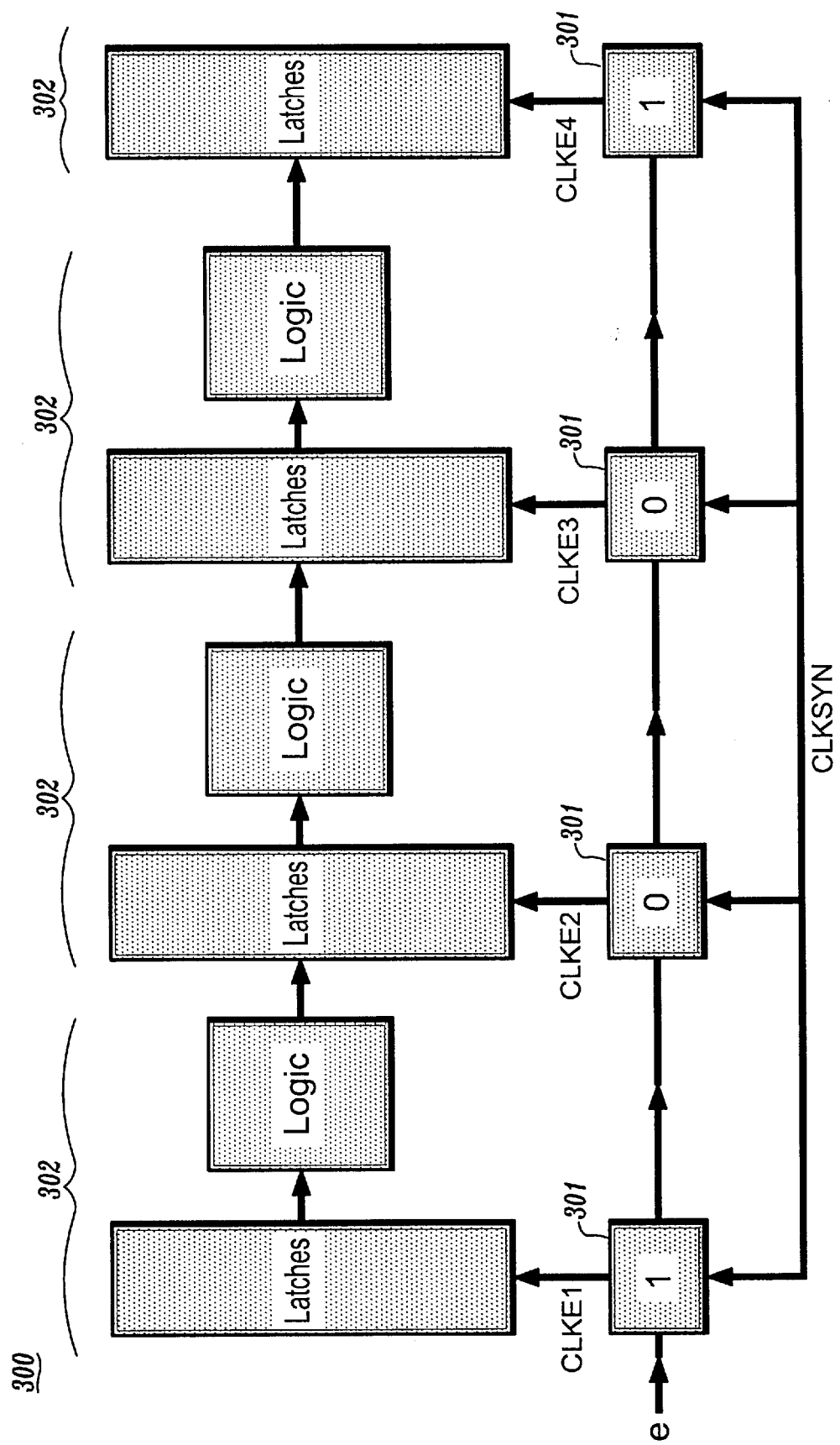
FIG. 10 is a schematic diagram showing a fine grained synchronous clock gating interface in accordance with another embodiment of the present invention.
Figure 11:
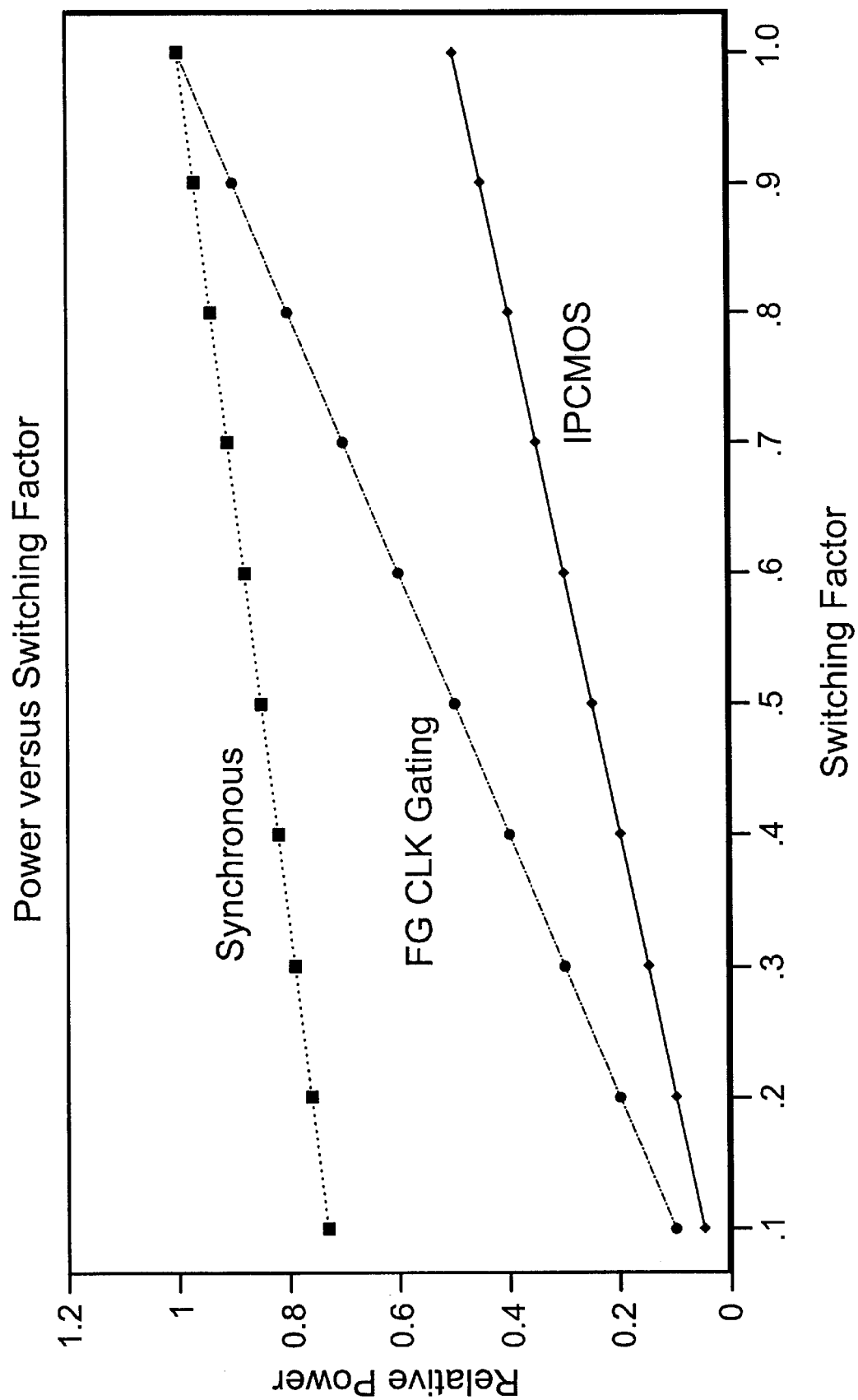
FIG. 11 is a plot of power versus switching factor comparing conventional synchronous circuits, interlocked pipeline CMOS circuits employing the present invention and the fine grained clock grating (FG CLK Gating) employing the present invention.

Referring to FIG. 10, a fine grained clock gating circuit 300 is illustratively shown in accordance with another embodiment of the present invention. The concepts described above can be modified to provide fine grained clock gating in synchronous systems as shown in FIG. 10. An e bit is ANDed in circuit 301 with a synchronous clock CLKSYN at every stage 302 to generate a local enable clock (CLKE). The e bit is propagated through a one bit wide register 301. If there is no e bit (e=0) at a stage there will be no local enable clock CLKE for that stage. A circuit similar to the one shown in FIG. 2A would be employed to perform the AND function in circuit 301. This fine grained clock gating results in a significant power reduction when compared to a conventional synchronous approach as shown in FIG. 11. However, compared to the IPCMOS case the power is roughly two times greater as a result of more complex latches.

As described above it is desirable to be able to replace portions of existing synchronous designs with asynchronous designs with the goal of achieving lower power and higher performance. One problem is the interface between the synchronous and asynchronous portions of the system.

Referring again to FIG. 1, two parallel paths are provide a synchronous to asynchronous to synchronous path 20 that is timed by a parallel synchronous path 11. The synchronous path 11 includes one bit wide latches clocked by CLKSYN the synchronous global clock. The number of stages in this path is chosen to correspond to the number of cycles of delay of the synchronous to asynchronous to synchronous path at the maximum frequency of operation. Since each of the e bit latch stages is clocked by CLKSYN, the time it will take for an e bit to propagate through the latches is a function of the number of latch stages in the pipe and the frequency or period of CLKSYN. If there is an operation to perform the e bit will be a set to a "1" and correspondingly if there is no operation the e bit will be set to "0".

When the e bit is set to "1", the e bit generates the enable clock in the synchronous to asynchronous stage launching data down this path. The same e bit after it has propagated through the synchronous timing path of one bit latches also provides the timing signal that generates the enable clock in the asynchronous to synchronous last stage of the pipeline. If the e bit is "0" it signifies no operation to perform. For this case, the "0" e bit will still propagate through the one bit timing latches but no local clocks are enabled in the synchronous to asynchronous to synchronous parallel path. Thus the local clocks are active when the e bit is a "1" and inactive when the e bit is a "0".

The timing of the two paths includes data propagating through the asynchronous path which arrives before the local enable clock of the last stage. The impact of global clock skew and jitter occurs only once with this approach and not on each stage. The one bit wide synchronous e bit path is enabled each cycle by the synchronous clock. Whereas the local clocks for each stage of the synchronous to asynchronous to synchronous path which are multiple bits wide are enabled if there is an operation to perform. This results in a significant power reduction unless there is an operation every cycle. In addition the latency through an asynchronous IPCMOS path is less than that of a conventional synchronous path. This is a result of the timing for each stage that does not have to be the same as for the conventional case but can be matched to the logic for the stage.

Figure 12:
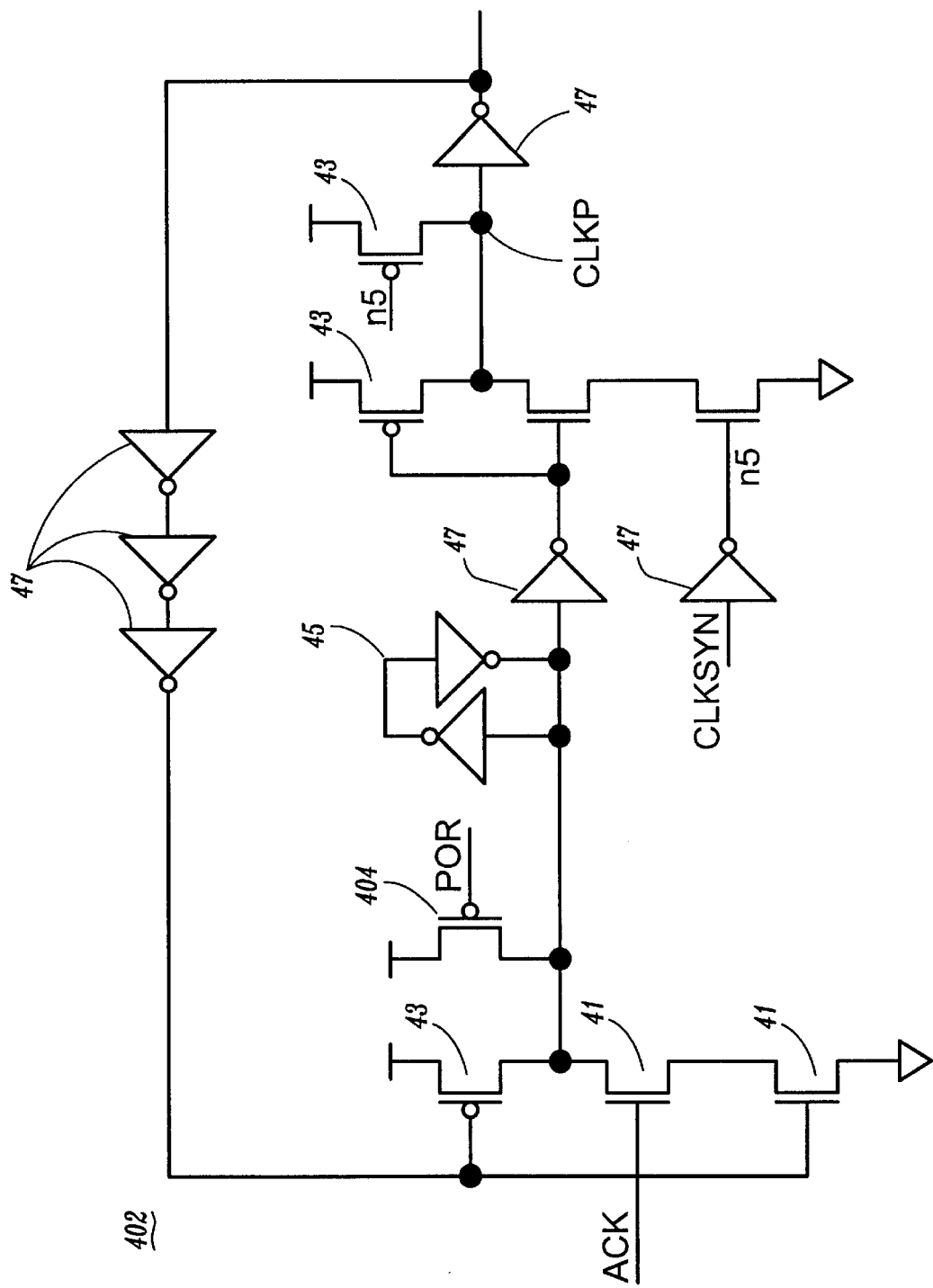
FIG. 12 is a schematic diagram showing a clock reset circuit for generating a reset clock signal for a synchronous to asynchronous stage of the interface of FIG. 1 in accordance with the present invention.

Referring to FIG. 12, a synchronous to asynchronous reset circuit 402 captures an acknowledgment (ACK) from the asynchronous downstream strobe circuits (e.g., circuit 31a) early in the cycle but circuit 402 is not enabled until CLKSYN goes low. This guarantees proper operation if the acknowledge occurs while CLKSYN is still active. Circuit 402 may be included to replace circuit 50 shown in FIG. 2B. Circuit 402 works in a similar manner as circuit 50 as described in FIG. 2B. Circuit 402 includes a transistor 404 which is enabled by a power on reset (POR) signal that initializes the conditions in the circuit when power is turned on. A node n5 is shown to indicate the input to transistor 43 which connects to CLKP in FIG. 12.

For the asynchronous circuits, since CLKE is a relatively short pulse, guaranteeing proper operation if the acknowledge occurs early in the cycle is not a concern. At an asynchronous to synchronous interface since the e bit only has to propagate through a latch for each synchronous cycle and not through logic e bit will be valid early in the cycle.

Figure 13:
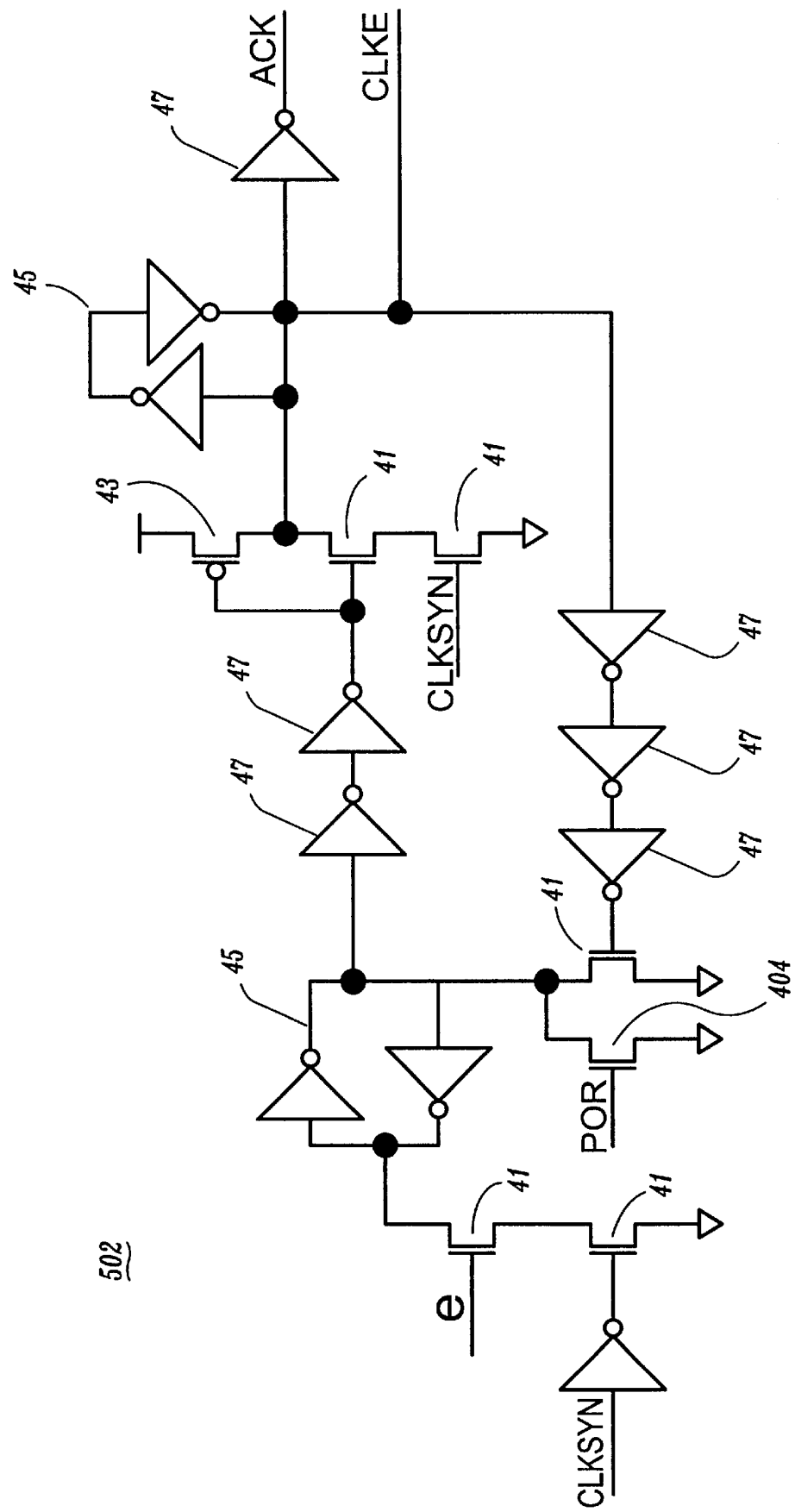
FIG. 13 is a schematic diagram showing a local clock circuit using an e bit to provide reduced delay for an asynchronous to synchronous stage of the interface of FIG. 1 in accordance with the present invention.

Referring to FIG. 13, the e bit being valid early in the cycle can be used to advantage in minimizing the delay in generating CLKE for the asynchronous to synchronous stage. FIG. 13 shows a circuit 502 which combines the functionality of circuits 74 and 76 described respectively in FIGS. 3A and 3B. Circuit 502 employs a power on reset (POR) signal as described above with reference to FIG. 12. Circuit 502 employs as inputs the e bit, CLKSYN, POR and outputs and ACK signal and CLKE. By employing circuit 502, delay is advantageously reduced since the use of the e bit early in the cycle is employed.

Figure 14:
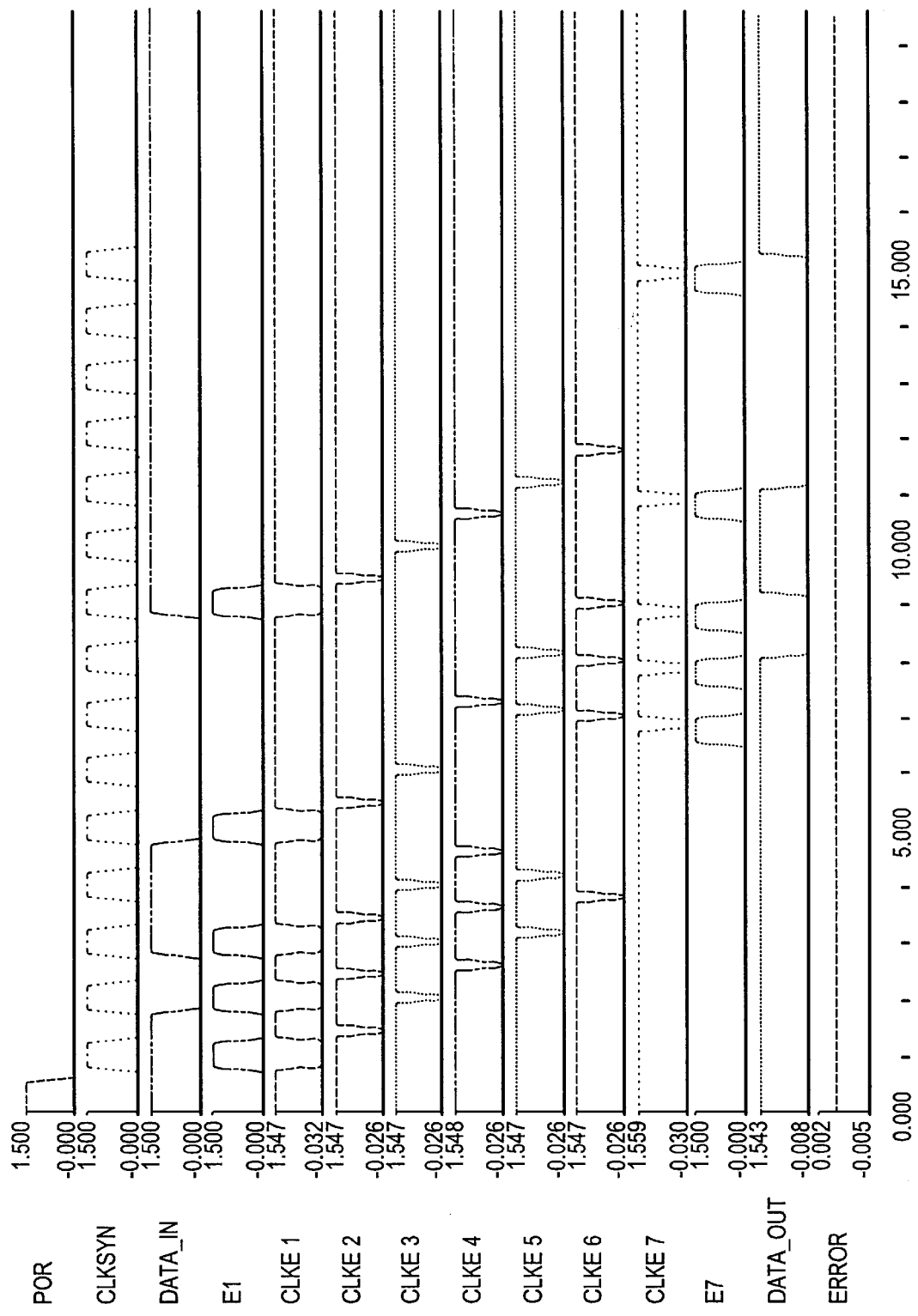
FIG. 14 is a timing diagram for a simulated interface which employs the circuits of FIGS. 12 and 13 in accordance with the present invention.

Referring to FIG. 14, a pipeline was modeled as in FIG. 4 with 7 stages to test the concepts and circuits of FIGS. 12 and 13 for the synchronous to asynchronous to synchronous handshaking. Simulated waveforms are shown in FIG. 14 for POR, the clocks (CLKE1–7), data (DATA_IN and DATA_OUT), and e bits (E1 and E7 at stage 1 and 7, respectively) and ERROR. The e bit delay from stage 1 to stage 7 was chosen to be six synchronous cycles the same as the number of stages. As illustratively shown by the waveforms the data propagates through the pipeline at a much faster rate for this example and must wait for the e bit to arrive. When the e bit arrives, the locally generated clocks run in the reverse direction as data is removed from the pipeline. The number of cycles of delay in the synchronous e bit path could be shortened.

Having described preferred embodiments of a system and method for a synchronous to asynchronous to synchronous interface (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as outlined by the appended claims. Having thus described the invention with the details and particularity required by the patent laws, what is claimed and desired protected by Letters Patent is set forth in the appended claims.

What is claimed is:

1. An interface between synchronous and asynchronous data transfer, comprising:
   a plurality of stages coupled to each other to form a pipeline for data transfer;
   the plurality of stages including:
      a first stage which performs synchronous to asynchronous data transfer;
      at least one intermediate stage which performs asynchronous to asynchronous data transfer; and
      a last stage which performs asynchronous to synchronous data transfer; and a synchronous clock path which propagates a timing signal across the plurality of stages in response to a synchrounous clock signal to enable the first and last stages to perform operations when the timing signal is present at that stage.

2. The interface as recited in claim 1, wherein the first and last stages includes a local clock circuit, the local clock circuit includes an AND gate to AND the timing signal and the synchronous clock signal.

3. The interface as recited in claim 2, wherein the timing signal is propagated by a one bit wide synchronous register.

4. The interface as recited in claim 2, wherein the local clock circuit corresponding to the first stage further comprises a precharge circuit coupled to the first stage wherein the precharge circuit generates a precharge pulse when a handshaking acknowledgment is received from the at least one intermediate stage that data has been received.

5. The interface as recited in claim 4, wherein the local clock circuit corresponding to the first stage further comprises a valid data signal generated when a local clock signal transitions and resets when the precharge pulse transitions, the valid data signal being sent to the at least one intermediate stage to indicate that valid data is available.

6. The interface as recited in claim 2, wherein the local clock circuit corresponding to the last stage further comprises a precharge circuit coupled to the last stage wherein the precharge circuit generates a precharge pulse and an acknowledge pulse that is initiated by the synchronous clock transitioning and terminated by the local clock signal transitioning for the last stage.

7. The interface as recited in claim 2, wherein the local clock circuit corresponding to the last stage further comprises an error signal generated if the local clock and a valid data signal from the at least one intermediate stage indicate that data is invalid.

8. The interface as recited in claim 1, where the at least one intermediate stage includes a plurality of stages which are pipelined and interlocked in the forward and reverse directions.

9. A synchronous to asynchronous to synchronous interface, comprising:
a plurality of stages coupled to each other to form a pipeline;
the plurality of stages including:
a first stage which performs synchronous to asynchronous data transfer;
at least one intermediate stage which performs asynchronous to asynchronous data transfer; and
a last stage which performs asynchronous to synchronous data transfer;
a clock circuit coupled to each of the plurality of stages which generates a local clock signal for the first and the last stages based on a synchronous clock signal and provides interlocking operation signals with stages interacting with the at least one intermediate stage, the local clock signal enabling the first stage and the last stage when an operation is to be performed by that corresponding stage.

10. The interface as recited in claim 9, wherein the clock circuit first and last stages includes an AND gate to AND a timing signal, indicating that an operation is to be performed, and the synchronous clock.

11. The interface as recited in claim 10, wherein the timing bit is propagated by a one bit wide synchronous register.

12. The interface as recited in claim 9, wherein the clock circuit corresponding to the first stage further comprises a precharge circuit coupled to the first stage wherein the precharge circuit generates a precharge pulse when a handshaking acknowledgment is received from the at least one intermediate stage that data has been received.

13. The interface as recited in claim 12, wherein the clock circuit corresponding to the first stage further comprises a valid data signal generated when the local clock signal transitions and resets when the precharge pulse transitions, the valid data signal being sent to the at least one intermediate stage to indicate that valid data is available.

14. The interface as recited in claim 9, wherein the clock circuit corresponding to the last stage further comprises a precharge circuit coupled to the last stage wherein the precharge circuit generates a precharge pulse and an acknowledge pulse that is initiated by the synchronous clock transitioning and terminated by the local clock signal transitioning for the last stage.

15. The interface as recited in claim 14, wherein the clock circuit corresponding to the last stage further comprises an error signal generated if the local clock and a valid data signal from the at least one intermediate stage indicate that data is invalid.

16. The interface as recited in claim 9, where the at least one intermediate stage includes a plurality of stages which are pipelined and interlocked in the forward and reverse directions.

17. A method for synchronous to asynchronous to synchronous data transfer, comprising the steps of:
providing a plurality of stages coupled to each other to form a pipeline, the plurality of stages including a first stage which performs synchronous to asynchronous data transfer, at least one intermediate stage which performs asynchronous to asynchronous data transfer and a last stage which performs asynchronous to synchronous data transfer;
propagating a synchronous timing signal along a synchronous clock path in response to a synchronous clock signal; and
enabling one of the first stage and the last stage of the plurality of stages only when an operation is to be performed to permit data transfer, the first and last stages being enabled by local clock signals generated by a clock circuit included at each of the plurality of stages, the local clock signal being generated in response to the synchronous clock signal and timing signal.

18. The method as recited in claim 17, wherein the clock circuit of the first and last stages includes an AND gate and further comprising the step of ANDing the timing signal, indicating that an operation is to be performed, and the synchronous clock.

19. The method as recited in claim 17, further comprising the step of propagating the timing signal by a one bit wide synchronous register.

20. The method as recited in claim 17, wherein the clock circuit corresponding to the first stage further comprises a precharge circuit coupled to the first stage and further comprising the step of generating a precharge pulse when a handshaking acknowledgment is received from the at least one intermediate stage that data has been received.

21. The method as recited in claim 20, wherein the clock circuit corresponding to the first stage further comprises a valid data signal generated when the local clock signal transitions and resets when the precharge pulse transitions, and further comprising the step of sending the valid data signal to the at least one intermediate stage to indicate that valid data is available.

22. The method as recited in claim 17, the clock circuit corresponding to the last stage further comprises a precharge circuit coupled to the last stage and further comprising the step of generating a precharge pulse that is initiated by the synchronous clock transitioning and terminated by the local clock signal transitioning.

23. The method as recited in claim 17, wherein the clock circuit corresponding to the last stage provides an error signal, and further comprising the step of generating the error signal if the local clock signal and a valid data signal from the at least one intermediate stage indicates that data is invalid.

24. A synchronous clock gating interface, comprising:

a plurality of synchronous stages coupled to each other to form a pipeline;

a plurality of clock circuits coupled to each other to form a synchronous clock path, wherein each clock circuit is coupled to a corresponding one of the plurality of stages, wherein each clock circuit generates a local clock signal for a corresponding stage based on a synchronous clock signal and a timing signal wherein the local clock signal enables the corresponding stage when an operation is to be performed by the corresponding stage.

25. The interface as recited in claim 24, wherein each clock circuit includes an AND gate to AND the timing signal, indicating that an operation is to be performed, and the synchronous clock.

26. The interface as recited in claim 24, wherein the timing signal is propagated by a one bit wide synchronous register.

* * * * *